Aug. 9, 1960 W. A. BISHMAN 2,948,314
WHEEL CENTERING AND SUPPORTING DEVICE
Filed June 4, 1956 5 Sheets-Sheet 1

INVENTOR.
WALTER A. BISHMAN
BY
*Paul, Moore & Dugger*
ATTORNEYS

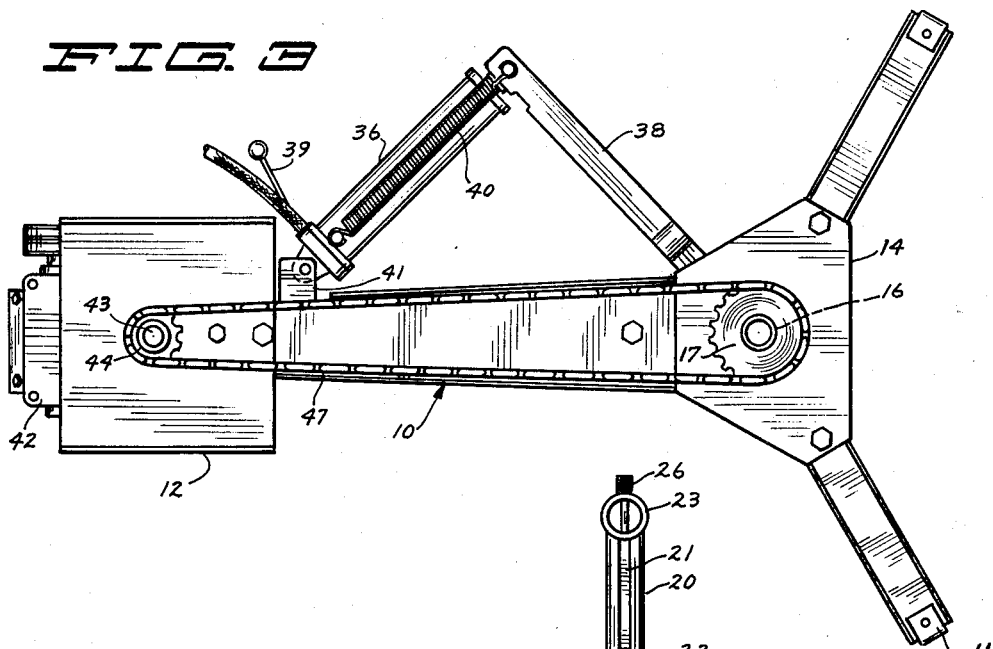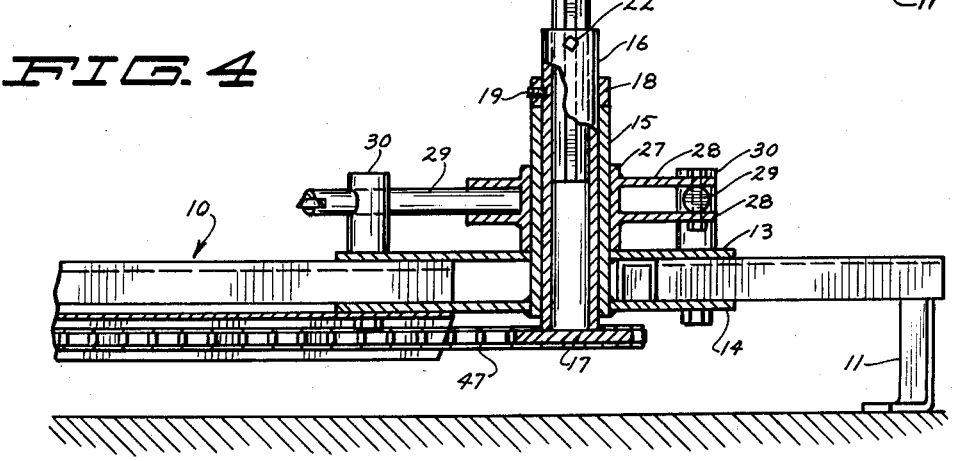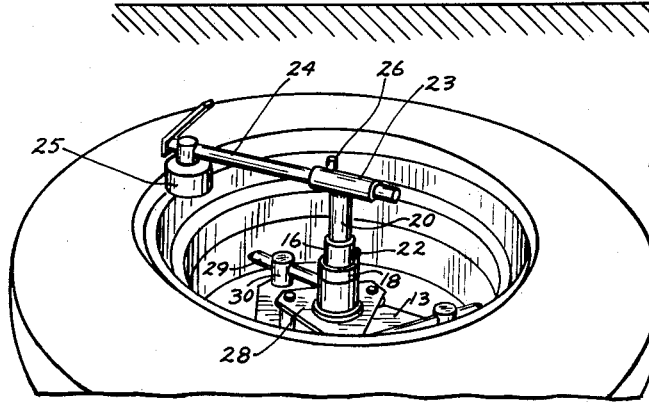

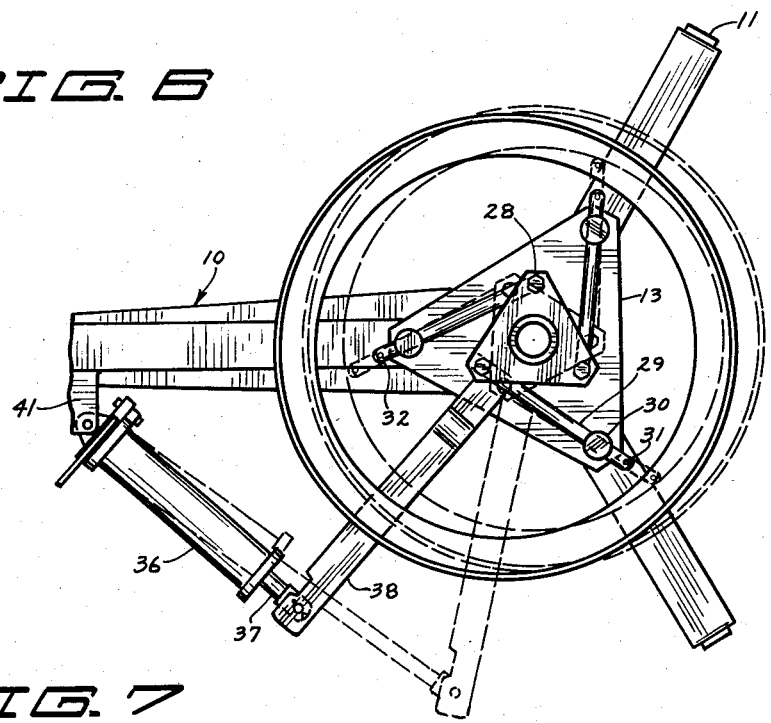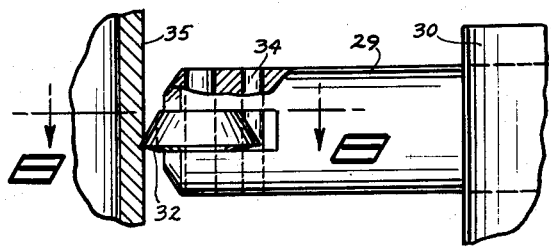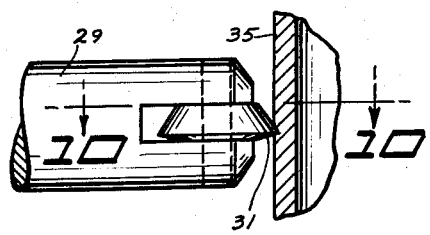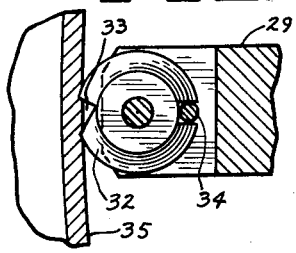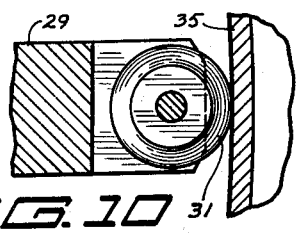
INVENTOR.
WALTER A. BISHMAN
ATTORNEYS Aug. 9, 1960 W. A. BISHMAN 2,948,314
WHEEL CENTERING AND SUPPORTING DEVICE
Filed June 4, 1956 5 Sheets-Sheet 4
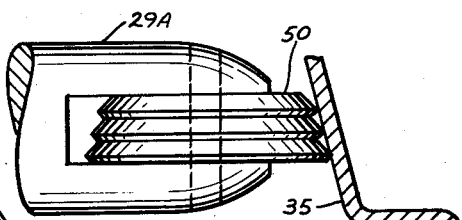
FIG.11
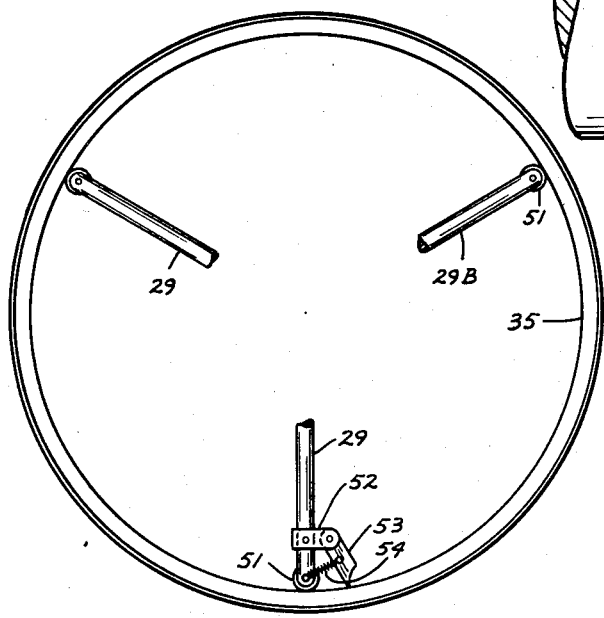
FIG.12
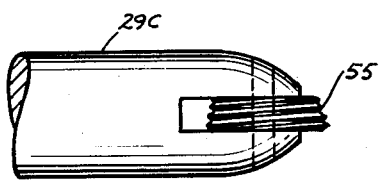
FIG.13
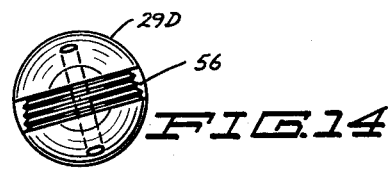
FIG.14
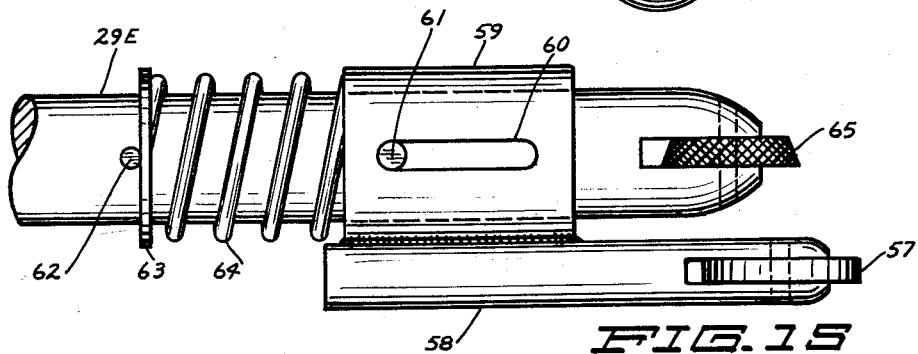
FIG.15
FIG.16
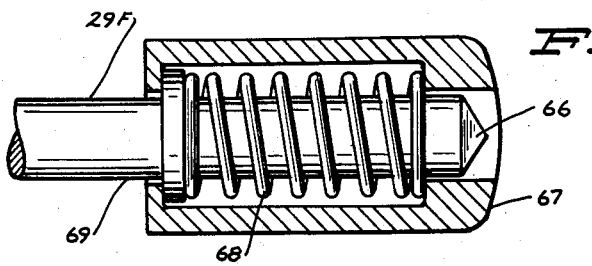
INVENTOR.
WALTER A. BISHMAN
BY
*Paul Moore & Dugger*
ATTORNEYS Aug. 9, 1960 W. A. BISHMAN 2,948,314
WHEEL CENTERING AND SUPPORTING DEVICE
Filed June 4, 1956 5 Sheets-Sheet 5
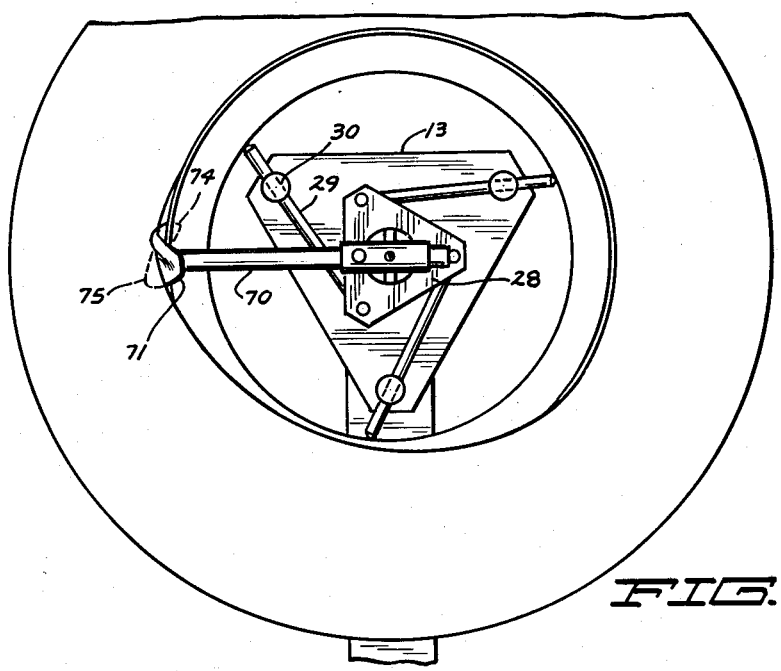
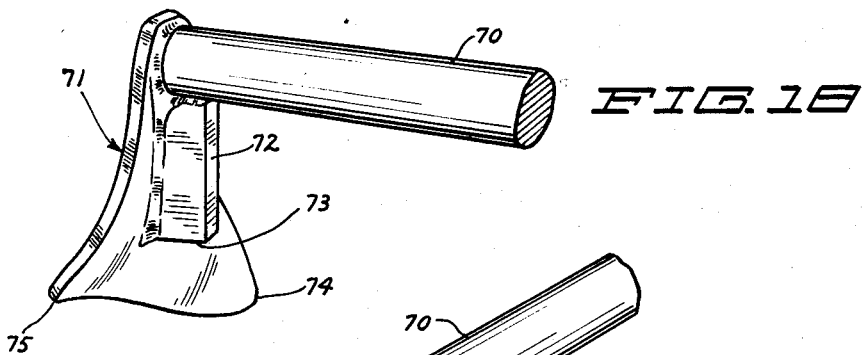
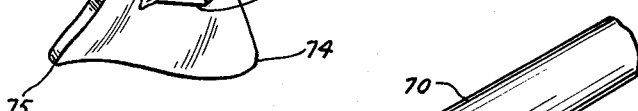
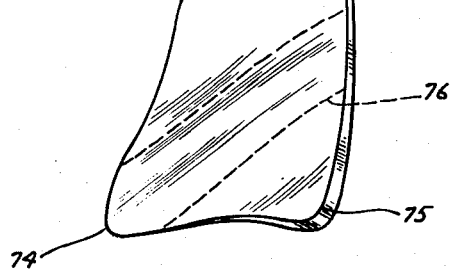
INVENTOR.
WALTER A. BISHMAN
BY
ATTORNEYS

United States Patent Office 2,948,314
Patented Aug. 9, 1960

2,948,314

WHEEL CENTERING AND SUPPORTING DEVICE

Walter A. Bishman, Minneapolis, Minn., assignor to Bishman Manufacturing Company, Osseo, Minn., a corporation of Minnesota Filed June 4, 1956, Ser. No. 589,317

9 Claims. (Cl. 144—288)

This invention relates to a device for changing tires, that is, for mounting and demounting tires on and off of wheel rims. More particularly, this invention relates to a device for changing tubeless tires, especially large heavy tires such as truck and bus tires.

Mounting and demounting tires by hand is an arduous task. Because the bead of the tire has a smaller periphery than that of the flange of the rim upon which it is mounted it is necessary to force the bead of the tire off or onto the rim at one point on its periphery and then utilizing the resiliency of the bead and the tire side wall gradually work the bead over the rim around its entire periphery. Devices have been developed to assist an operator in tire changing by providing means for holding the rim and mechanically rotating the tire changing tools around the periphery of the rim. The known prior art tire changers are invariably mounted on a stand or pedestal so that the tire and rim are at a convenient working height. While such mechanical tire changers as are known are effective for changing most automobile tires, they are not capable of coping with larger and heavier tires such as truck and bus tires which cannot be lifted. Tubeless tires present special problems since care must be taken to avoid damaging the air seal of the tires.

It is the principal object of this invention to provide a safe, rugged, low-level, high-speed tire changer for tubeless truck and bus tires.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of this invention, these being indicative, however, of but a few of the various ways in which the principles of the invention may be employed.

The invention is illustrated by the drawings in which the same numerals refer to corresponding parts and in which:

Figure 3 is a bottom plan view;

Figure 4 is a detailed elevation, partly in section, taken generally on the line 4—4 of Figure 1 and in the direction of the arrows;

Figure 5 is a perspective view of the tire on the changer shown with a mounting tool in operative position;

Figure 6 is a detailed plan view of the rim chuck mechanism;

Figure 7 is an elevation, partly in section, of a stationary rim gripping element of the rim chuck;

Figure 8 is a horizontal section taken on the line 8—8 of Figure 7 and in the direction of the arrows;

Figure 9 is an elevation similar to Figure 7 but showing one of two rotatable rim gripping elements of the rim chuck;

Figure 10 is a horizontal section taken on the line 10—10 of Figure 9 and in the direction of the arrows;

Figures 11 through 16 show modified forms of rim-centering and gripping members which may be used with the tire changer of this invention;

Figure 17 is a fragmentary top plan view showing a bead removal tool in use in the tire changer; and Figures 18 and 19 are perspective views of the back and front, respectively, of the bead removal tool.

Figure 1:
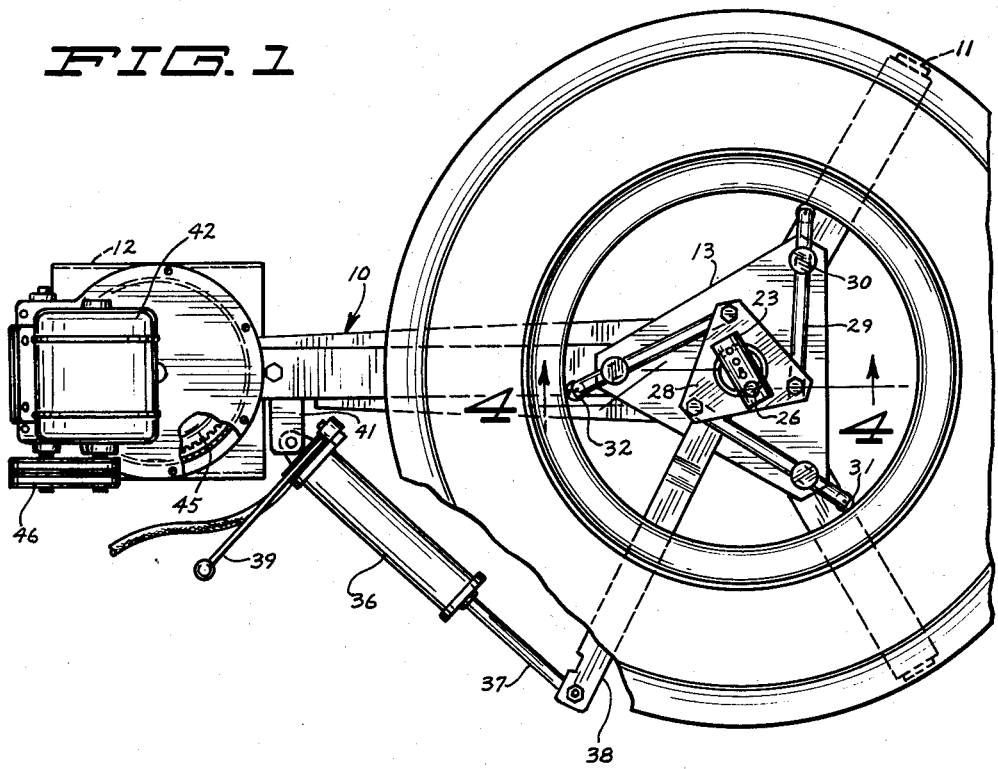
Figure 1 is a top plan view of the tire changer of this invention shown with a tire in place.
Figure 2:
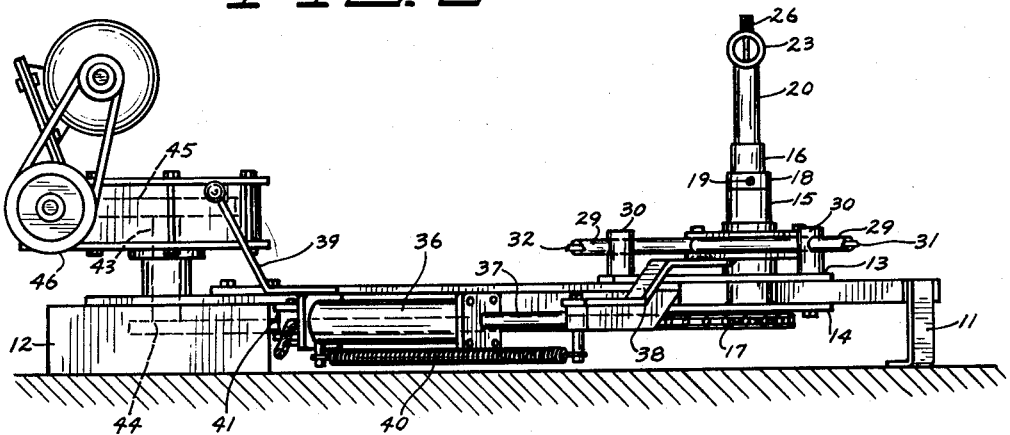
Figure 2 is an elevation of the device without a tire.

Referring now to the drawings, the tire changer of this invention comprises generally a low-level Y-shaped base platform indicated at 10 supported at one end by feet 11 and at the other end by side walls 12. At the point of convergence of the arms of platform 10 there is mounted a pair of generally triangular base plates, an upper plate 13 and a lower plate 14, both immovably fastened to the frame. Centrally positioned and passing through both plates 13 and 14 is a tubular sleeve 15. Sleeve 15 is welded or otherwise permanently secured to the plates and projects perpendicularly upward from the surface of base plate 13.

Journalled for rotation within sleeve 15 is a second and longer sleeve 16. Sleeve 16 has a sprocket 17 keyed or otherwise fixedly secured to its lower end and is retained in sleeve 15 by a collar 18 which rotates on the top of sleeve 15 and is held by a set screw 19. A tube or rod 20 is mounted in sleeve 16 for rotation with sleeve 16 but movable vertically with respect to the sleeve. Member 20 has a longitudinal spline or keyway 21. A set screw 22 in cooperation with spline 21 permits imparting the rotational movement of sleeve 16 to the member 20 while at the same time permitting vertical adjustment.

Welded horizontally to the top surface of member 20 to form a T is a tubular sleeve 23. Sleeve 23 is adapted to receive the arm 24 of a tire changing tool, such as mounting tool 25 shown in Figure 5, for rotation around the periphery of the tire bead and wheel rim. Arm 24 is slidable longitudinally in sleeve 23 for adjustment to variations in tire sizes. Arm 24 is provided with at least one transverse vertical hole. Sleeve 23 is provided with a plurality of holes aligned longitudinally along its upper surface. A drop pin 26 engages the holes of the sleeve 23 and arm 24 to secure the tire changing tool in the desired position. The holes are so spaced as to provide settings for the several standard sizes of rims to be accommodated by the tire changer. Alternatively a thumb screw may be provided for securing the tire changing tool in desired position.

The maximum height of horizontal sleeve 23 when in its lowest position resting on the top edge of vertical sleeve 16 is less than the inner diameter of the rim to be held so that a tire on its rim or a rim alone when in a vertical plane can readily be rolled up adjacent to the rim chuck end of the tire changer and then overturned so as to drop the rim over the sleeve 32 dropped. Because of the low-level base and the low height of the tool-holding sleeve 23 the rim easily flops over into place, resting on the arms of the base and ready to be centered and held as explained in detail hereinafter.

Mounted above plate 13 for slight rotational turning movement on the outside of sleeve 15 is an outer sleeve 27. Welded or otherwise secured to sleeve 27 is a pair of spaced apart generally triangular plates 28 disposed so as to be in registry. Pivotally mounted at each of the apexes of plates 28 and between the plates is a rim engaging member or arm 29, which upon rotation of sleeve 27 and plates 28 moves slidably in channels in posts 30 secured at the apexes of upper large plate 13. The action of arms 29 can be likened to that of an iris diaphragm. When sleeve 27 and plates 28 are rotated the arms 29 move in or out eccentrically but uniformly so that the outer extremities of arms 29 are at all times equidistant from the central axis of rotation of sleeve 27 and plates 28.

As shown in detail in Figures 7 to 10, at their extremities rods 29 are provided with sharp rim engaging rollers or disks of hardened steel, two of which, indicated at 31, are rotatably mounted in slots. The remaining roller or disk 32 is provided with a V-notch 33 at one edge and is locked against rotation by a pin 34 through the rod so as to always present the V-notch 33 to the inner periphery 35 of a wheel rim. This is one form of rim gripping means which is useful in the tire changer of this invention.

Rods 29 with their rim engaging means 31 and 32 and associated mechanism constitute a rim chuck for grasping and holding a wheel rim firmly against rotation for mounting or dismounting a tire, as will be explained in detail hereinafter. Movement is imparted to the plates 28 and rods 29 by a fluid pressure cylinder 36 to whose piston 37 there is pivotally connected an arm 38 which in turn is welded to one of plates 28.

Cylinder 36 is connected to any suitable source of fluid under pressure through a valve actuated by a handle 39. Upon release of the fluid, piston 37 and arm 38 are retracted by coil spring 40. Cylinder 36 is pivotally mounted on a bracket 41 which is welded to base 10. The air cylinder may conveniently be replaced by an ordinary and conventional hydraulic or mechanical hand jack mounted between bracket 41 and arm 38.

The tool carrying head 23 and its accessory elements preferably are rotated from a power unit mounted at the opposite end of the base 10. The power unit includes an electric motor 42 mounted to drive a shaft 43 and sprocket wheel 44 through a conventional worm gear having a worm wheel 45 at the opposite end of shaft 43 and a worm (not shown). The worm is driven by a belt drive from motor 42 to a pulley 46 keyed to the worm shaft. A chain drive connects sprockets 44 and 17. The gear unit is enclosed in an appropriate housing as shown. The system of gears produces the desired reduction in speed of rotation to drive the tire changing tools around the periphery of the rim at the proper rate.

The motor drive may optionally be omitted and the changer may be operated manually. This may be done simply by engaging arm 24 holding the tire changing tool at its outer end adjacent the tool 25 with any suitable pusher rod and then manually pushing tool 25 around the periphery of the rim. The pusher may be any rigid rod or tube having a notch or cradle at one end for engaging the arm 24 of the tool without easily slipping off.

Although plates 13 and 28 are shown to be triangular in shape and there are there sets of rim engaging elements it will be apparent that three is merely the minimum number. Obviously more than three sets of rim engaging elements may be used so long as they are of equal length and uniformly disposed around the central axis. Only one of the rim engaging rollers should be notched as is roller 32 regardless of the total number.

To begin the operation of the changer of this invention rods 29 are in retracted position. Whether a tire is to be mounted or dismounted, the rim or rim with tire is rolled up adjacent to the Y-branched end of base 10 and dropped or flopped over the base so as to enclose all of rods 29 and their rim engaging elements 31 and 32. Fluid is then introduced into the cylinder 36 (or the jack is pumped) extending piston 37 and pushing arm 38 forward. The movement of arm 38 causes plates 28 to rotate with sleeve 27 on stationary sleeve 15 and imparts an eccentric outward motion to rods 29. Rods 29 move out iris-like through the channels in posts 30 and into engagement with the inner periphery of the rim. Because all of arms 29 are of equal length and disposed at the same angle and same distance about the central axis they automatically center the rim.

The teeth of the V-notch 33 of stationary rim engaging element 32 bite into the softer metal of the rim at their first point of contact. The rotatably mounted rollers or disks 31 permit relative movement with the rim until the teeth of the V-notch engage the rim. When all of the rim engaging elements have bit in the rim is centered with respect to the central axis. It is held against rotational movement by the teeth of the V-notch and against vertical movement by the "bite" of the rim engaging disks into the inner periphery of the rim.

The appropriate tire mounting or tire removing tool is then inserted in the tool receiving sleeve 23. The radius of rotation of the tool is set by moving the arm 24 in sleeve 23 and dropping pin 26 into the appropriate opening. The proper height of the tool is set by adjusting set screw 22. The motor is then turned on and the tool is rotated around its central axis to force the bead of the tire on or off of the rim step by step around the periphery of the rim. Or, if a manually operated device, the tool is pushed by hand around the periphery of the rim while the rim is held stationary.

Both beads of the tire must be treated individually. In removing a tire from a rim the tire is first deflated and the demounting tool is inserted around the uppermost bead of the tire as it lies on the changer. The tool is then run around the periphery of the rim freeing the upper bead. The tire is then lifted so that at one point the lower bead is adjacent the upper rim flange and the tool is again inserted. The tool is then run around the lowermost bead and the tire is free.

In mounting a tire the reverse procedure is followed. The lowermost bead of the tire is first applied over the uppermost rim flange, the tire drops down and then the uppermost bead is applied. The tire changing tool is then removed and pressure is released from cylinder 36 (or the jack, if used). Spring 40 assists in retracting piston 37 and arm 38 which in turn rotates plates 28 and retract rods 29 and their rim engaging elements from the rim.

In Figures 11 to 16 there are shown several alternative forms of rim gripping and centering elements which may be utilized in place of disks 31 and 32.

In Figure 11 there is shown a rim engaging roller or wheel 50 rotatably mounted in a slot at the end of arm 29A. Wheel 50 is provided with a plurality of sharp edges for engaging the inner periphery of rim 35. The successive sharp edges are disposed at an angle of about 15 degrees from the vertical to correspond to the taper of the rim. As described previously with respect to disks 31 and 32, where three wheels are used, two would be free to rotate and one would be fixed against rotation. The fixed wheel prevents the rim from turning due to the friction resulting from the multiple gripping of the rim. If additional gripping power is desired or necessary, the fixed wheel may also be notched in the manner of disk 32.

Figure 12 illustrates a form of rim chuck utilizing three radial arms 29B each provided with a wheel or disk 51. Wheels or disks 51 are each freely rotatable, and may be in any of a variety of forms such as disk 31 in Figures 9 and 10, wheel 50 in Figure 11, wheel 65 in Figure 15, or the like. One of arms 29B is fitted with a bracket 52 to which there is pivotally attached a dog or pawl 53 urged by a coil spring 54 toward arm 29B. When power is applied in a clockwise direction the dog or pawl 53 digs into the rim to prevent it from turning while rollers 51 hold the rim down.

In Figure 13 there is shown a further modified form of roller. Rim chucking arm 29C is provided with a screw threaded roller 55. Roller 55 is tapered to correspond to the taper of the rim. When this type of roller is used all are mounted so as to be free to rotate and thus serve to center the rim. When power is applied the tendency of the rim is to turn clockwise. This turning causes rotation of rollers 55 and the downward incline of the threads forces the rim downward. This increases the friction at the spots where the rim meets the main frame and causes the rollers to increase their bite in the smaller upper portion of the rim holding the rim down and against turning.

Figure 14 shows another form of chuck roller. Roller 56 is similar to roller 50 of Figure 11 but is mounted in chuck arm 29D so as to incline from the horizontal. Roller 56 is not threaded. The sharp biting edges are parallel but are disposed with a taper corresponding to the taper of the rim. As the power is applied and the rim tends to turn clockwise the inclined edges of roller 56 force the rim down and hold it from turning. Where rollers 56 are used as gripping members in the rim chuck all may be rotatable, or, if desired, one may be fixed against rotation.

Figure 15 shows a form of chuck gripping member wherein the chucking arm 29E is provided with a spring loaded roller arm for centering the rim, after which the roller gives way under spring tension to permit the gripping roller to bite into the rim. Centering roller 57 is mounted for rotation in a horizontal slot in the end of a short arm 58 which is secured to sleeve 59 on the underside of chuck arm 29E. Sleeve 59 is slidably mounted on arm 29E guided and stopped by slots 60 engaging pin 61. A further pin 62 holds collar 63 and assists coil spring 64 in urging sleeve 59 outward, bearing against pin 61. A knurled gripping roller 65 is rotatably mounted in a horizontal slot at the end of arm 29E. The exposed edges of rollers 57 and 65 are so disposed that roller 57 in its normal extended position extends beyond roller 65.

When a rim is placed on the changer equipped with this form of chuck member the inner periphery of the rim is first contacted by the centering rollers 57 in turn until the rollers 57 all engage the rim. Then, as the arms 29E are pushed farther outward they move against the pressure of spring 64 relative to sleeve 59 forcing rollers 57 back until rollers 65 come into contact with the rim. Rollers 65 will serve to hold the rim down. To hold it against turning one of rollers 65 may be fixed against rotation, with or without notching, or one of rollers 57 may be provided with a dog or pawl in the manner shown in Figure 12. Where the rim chuck is provided with three arms only two need be of the construction shown in Figure 15, but all three may be.

In Figure 16 there is shown another form of centering and gripping member. Chuck arm 29F is in this instance provided simply with a sharp point or tip 66. Tip 66 is shielded by means of a cap 67 having a smooth rounded head with an opening from which the tip may protrude. The cap 67 is normally urged out beyond the end of tip 66 by means of a strong coil spring 68 pushing against an inner shoulder of the cap and a collar 69 secured to arm 29F. Spring 68 is strong enough to keep the tip 66 shielded until the rim is centered. Then the outward pushing force of arm 29F is sufficient to overcome the spring tension to force cap 67 back so as to expose tip 66 permitting it to bite into the inner periphery of the rim to hold it down and against turning. Where the rim chuck has three arms only two need be equipped with this form of element. The other need have only a pointed tip like 66.

In Figures 17 to 19 there is shown a bead removal tool and the manner of using it. The tool comprises an arm 70 adapted to be received in the tool holding sleeve 23 and a head or plowshare 71. The tool has a block 72 of steel welded along one end to the bottom surface of the end of arm 70 and along one side to the back surface of the plowshare 71. The bottom surface 73 of block 72 rests upon the flange of the rim when in use and serves both as a support and a guide for the tool. The head or plowshare 71 is so named because of its resemblance to a plowshare. It includes a blunt pointed toe portion 74 and a heel portion 75. When the tool is in place in the tire changer with guide surface 73 resting on the bead of the rim, toe portion 74 inclines downwardly and inwardly so that the extreme tip is well within the periphery of the rim. The heel portion inclines downwardly and outwardly so that its extreme tip is well outside the periphery of the rim. The face of the plowshare is so contoured as to form a shallow channel, indicated generally at 76, which extends angularly upward across the face from the toe portion 74 to a point on the opposite edge above the level of the guide surface 73.

To demount a tire the bead of the tire is first forced away from the periphery of the rim to permit the plowshare 71 to be inserted. The toe portion 74 extends within the periphery of the rim while the heel portion 75 remains outside, both below the edge of the rim. The result is that the bead of the tire tends to ride generally in the shallow channel 76 in the face of the plowshare from below the edge of the rim to above the edge of the rim. Then as the tool is advanced in a clockwise direction around the periphery of the rim bead of the tire is guided off the rim easily and without damage to the tire.

It is apparent that many modifications and variations of this invention as hereinbefore set forth may be made without departing from the spirit and scope thereof. The specific embodiments described are given by way of example only and the invention is limited only by the terms of the appended claims.

I claim as my invention:

1. A heavy duty tire changer machine comprising a low-level horizontal base, a substantially perpendicular stationary sleeve extending through said base and projecting above said base, an inner sleeve mounted for rotation within said stationary sleeve, a tire changing tool holding element adjustably mounted for rotational movement with said inner sleeve and vertical movement with said inner sleeve, said tool holding element including a transverse sleeve for receiving a tool and means for adjustably retaining said tool, means for rotating said inner sleeve and tool holding element, the top of said tool holding element when in its lowermost position is lower than the highest portion of the opening thru the rim to be held in the changer when the rim is positioned vertically beside the machine, an outer sleeve mounted for rotation about said stationary sleeve above said base, a pair of spaced plates mounted for rotation with said outer sleeve, a plurality of at least three elongated rim engaging arms of substantially equal length each pivotally mounted at one end between said plates and uniformly arrayed around the central axis of said sleeves, each of said elongated rim engaging arms being provided with a hardened metal rim engaging rollers, one of said rollers being stationary and having biting teeth for engaging a rim, the remainder of said rollers being rotatably mounted, a plurality of guide members mounted on said base equal in number to said elongated rim engaging arms, each of said guides having a channel through which said arm may move slidably, said guide being uniformly arrayed about said central axis and displaced out of radial alignment with the pivot points of said arms, a lever arm for rotating said spaced plates and fluid pressure cylinder means for moving said lever arm.

2. A tire changer according to claim 1 further characterized in that said rim engaging rollers are tapered and comprise a plurality of annular peripheral sharp biting edges.

3. A tire changer having a platform frame for holding a tire rim placed thereon, a stub shaft attached to the frame so as to protrude upwardly therefrom and thru a rim on the frame, rim centering pushers mounted so as to extend generally outwardly in spaced relationship around said shaft, means for moving said pushers so as to move their outer ends like distances toward the stub shaft or away from said stub shaft for engaging the inner surface of a rim when the rim is placed on the frame around said shaft, the outer end of one of the pushers being formed to engage and hold the rim against rotation about said shaft and against substantial movement away from said platform frame, the remainder of said pushers having their outer ends provided with means moveable along the inner circumferential surface of said rim said means being formed so as to resist movement in a direction parallel to the axis of the rim.

4. The tire changer of claim 3 further characterized in that each said pusher is provided with a sharp edged wheel mounted so as to protrude from and form the outermost end of the pusher engaging the rim, said wheel being journaled on the pusher so that the wheel will roll generally circumferentially around the inner surface of the rim, and one of said pushers is provided with a stop for engaging the rim and holding it from rotation about said shaft.

5. A heavy duty tire changer machine comprising a low-level base, a substantially perpendicular stationary sleeve extending through said base and projecting above said base, a vertical member mounted for rotation within said stationary sleeve, a tire changing tool holding element adjustably mounted for vertical movement with respect to said vertical member and rotational movement with said member, the top of said tool holding element in its lowermost position being lower than the highest portion of the opening formed by the rim to be held in the changer when the rim is positioned vertically beside the machine, an outer sleeve mounted for rotation about said stationary sleeve above the base, a plate mounted for rotation with said outer sleeve, a plurality of at least three elongated rim engaging arms of substantially equal length, each pivotally mounted on said plate and uniformly arrayed around the central axis of said sleeves, a hardened metal rim engaging roller mounted on each of the elongated rim engaging arms, one of said rollers being stationary and having biting teeth for engaging a rim and the remainder of said rollers being rotatably mounted, a lever arm for rotating said plate, and means for moving said lever arm.

6. A tire changer according to claim 5 further characterized in that said rollers are tapered and comprise a plurality of annular peripheral sharp biting edges.

7. A tire changer comprising a frame for holding a tire rim, a shaft attached to the frame to project from said frame, a tire tool, means mounted on the shaft for mounting the tire tool for axial and rotational movement with respect to said shaft, said mounting means being constructed to slideably retain the tire tool, a plurality of at least three elongated arms of substantially equal lengths, each arm pivotally mounted to be extended and retracted, said arms being uniformly arranged around the central axis of said shaft, one of said arms having means on its distal end portion for forming a biting engagement with the inner surface of a rim when the rim is placed on the frame around said shaft, the other arms having means on their distal end portions for resisting the movement of said rim in a direction parallel to the axis of the rim when the arms are in an extended position and freely permitting the inner surface of the rim to be moved therearound when the arms are slightly retracted, and means for moving said arms between an extended and a retracted position.

8. A heavy duty tire changer machine comprising a low level base, a substantially perpendicular stationary sleeve mounted on said base to project about said base, a vertical member mounted for rotation within said stationary sleeve, a tire changing tool holding member adjustably mounted for vertical movement with respect to said vertical member and rotatable movement within said member, a plurality of at least three elongated rim engaging arms of substantially equal length, means mounting said arms above the base on a uniform array around the central axis of said sleeve, for extending and retracting said arms, said arms each having rim engaging means formed on the outer end portions thereof, one of the rim engaging means having a sharp pointed portion to abut against the rim for preventing rotation of said rim about the sleeve, and each of the other rim engaging means having a smooth rim engaging surface portion that offers low frictional resistance to the movement of the rim in a plane perpendicular to the sleeve and prevents vertical movement of said rim when at least three of said rim engaging means engages the inner surface of the rim.

9. A tire changer according to claim 8 further characterized in that said tire changing tool holding member includes a transverse sleeve for receiving a tire changing tool and means for adjustably retaining said tool.

References Cited in the file of this patent

UNITED STATES PATENTS

| | | |
|---|---|---|
| 1,341,727 | Weaver | June 1, 1920 |
| 1,591,193 | Weaver | July 6, 1926 |
| 2,418,849 | Polt | Apr. 15, 1947 |
| 2,439,135 | Johnson et al. | Apr. 6, 1948 |
| 2,471,642 | Moltz | May 31, 1949 |
| 2,482,789 | Moore | Sept. 27, 1949 |
| 2,546,849 | Branick | Mar. 27, 1951 |
| 2,547,976 | Rockwell | Apr. 10, 1951 |
| 2,556,024 | Bourdon et al. | June 5, 1951 |
| 2,655,985 | Henderson | Oct. 20, 1953 |
| 2,695,659 | Athmann | Nov. 30, 1954 |
| 2,777,507 | Branick | Jan. 15, 1957 |

UNITED STATES PATENT OFFICE
CERTIFICATE OF CORRECTION

Patent No. 2,948,314                          August 9, 1960

Walter A. Bishman

It is hereby certified that error appears in the printed specification of the above numbered patent requiring correction and that the said Letters Patent should read as corrected below.

Column 3, line 52, for "there", second occurrence, read -- three --; column 6, line 38, for "with" read -- within --; column 8, line 15, for "about" read -- above --.

Signed and sealed this 4th day of April 1961.

(SEAL)
Attest:    ERNEST W. SWIDER

XXXXXXXXXX
Attesting Officer

ARTHUR W. CROCKER
                                             Acting Commissioner of Patents